United States Patent
Yano et al.

[11] Patent Number: 5,846,475
[45] Date of Patent: Dec. 8, 1998

[54] METHOD FOR REDUCING SHRINKAGE OF EXTRUDED RUBBER

[75] Inventors: Masashi Yano, Sayama; Yasuyoshi Kawaguchi, Higashiyamato, both of Japan

[73] Assignee: Bridgestone Corporation, Tokyo, Japan

[21] Appl. No.: 592,634

[22] Filed: Jan. 26, 1996

[30] Foreign Application Priority Data

Mar. 9, 1995 [JP] Japan ................... 7-049627

[51] Int. Cl.$^6$ .................... B29C 47/88; B28B 1/08
[52] U.S. Cl. ............... 264/444; 264/69; 264/70; 264/442
[58] Field of Search ................... 264/444, 443, 264/442, 70, 69, 71

[56] References Cited

U.S. PATENT DOCUMENTS

| | | | |
|---|---|---|---|
| 3,285,442 | 11/1966 | Tigner | 264/444 |
| 4,288,398 | 9/1981 | Lemelson | 264/70 |
| 5,068,068 | 11/1991 | Furusawa et al. | 264/70 |

FOREIGN PATENT DOCUMENTS

| | | |
|---|---|---|
| 1426841 | 9/1988 | U.S.S.R. |
| 2 117 311 | 10/1983 | United Kingdom |

OTHER PUBLICATIONS

Rao, H. M., "Vibratory Moulding and Testing: A New Technique and Approach for Quality Product", Popular Plastics, 31, 6, pp. 19–28, 1986.
Ibar, J. P., "Improving Molding Through Melt Flow Oscillation", Modern Plastics International, 25, 1, pp. 72–79, 1995.
English language Abstract of Soviet Union Patent 910 459 A Mar. 7, 1982.
English language Abstract of Japanese Patent Publication No. 01087223, Mar. 31, 1989.
English language Abstract of Japanese Patent Publication 02235719, Sep. 18, 1990.

*Primary Examiner*—Jan H. Silbaugh
*Assistant Examiner*—Mark Eashoo
*Attorney, Agent, or Firm*—Oliff & Berridge, PLC

[57] ABSTRACT

Method and apparatus for reducing a shrinkage amount of a rubber member (51) which is comprised of a rubber (3) extruded from an extruder (1). At least one vibrator unit (10a, 10b) applies vibration to the extruded rubber (3) so as to increase the shrinkage speed of the extruded rubber (3) and cause a sufficient advance shrinkage of the extruded rubber within the extrusion train (1), thereby reducing a posterior shrinkage amount of the rubber member (51). An adjustable thermoregulator (30) maintains the extruded rubber (3) at a controlled temperature during application of vibration.

6 Claims, 6 Drawing Sheets

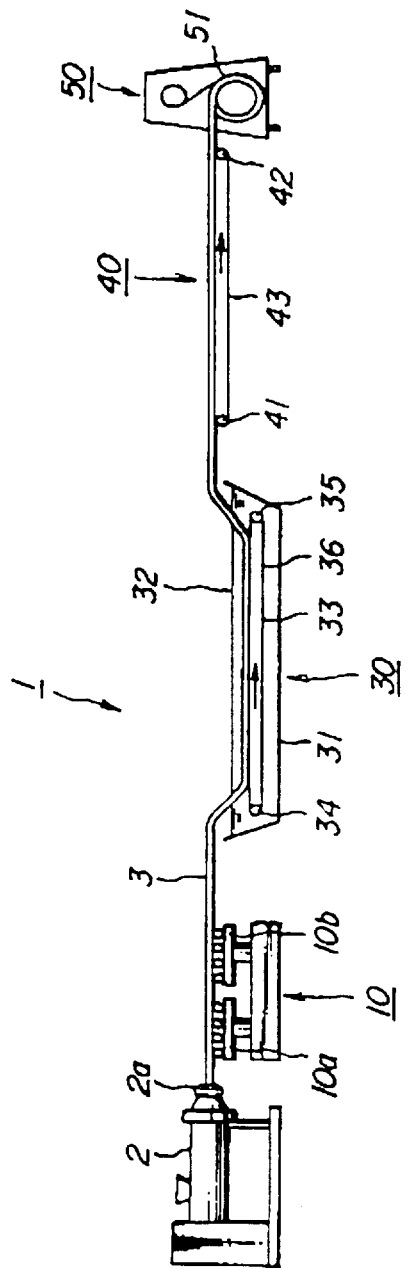

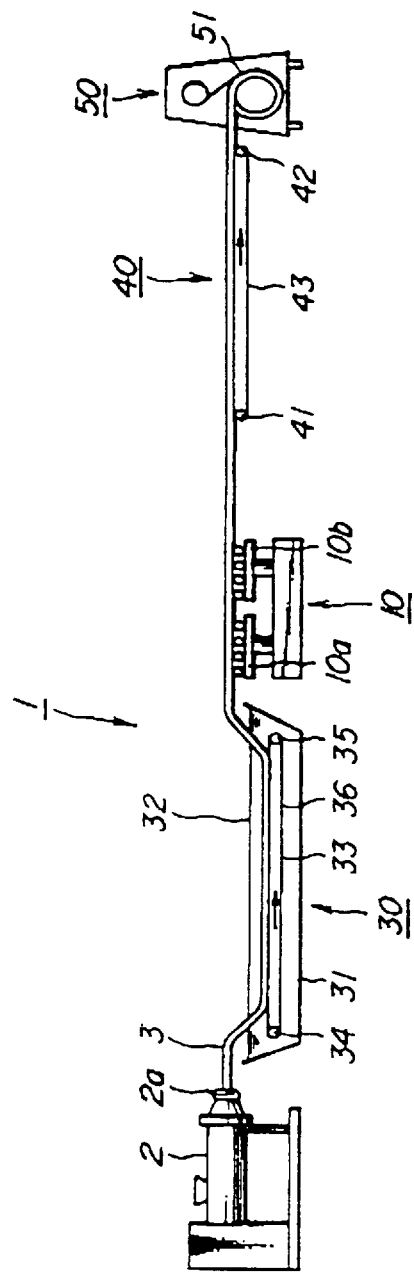

FIG_3
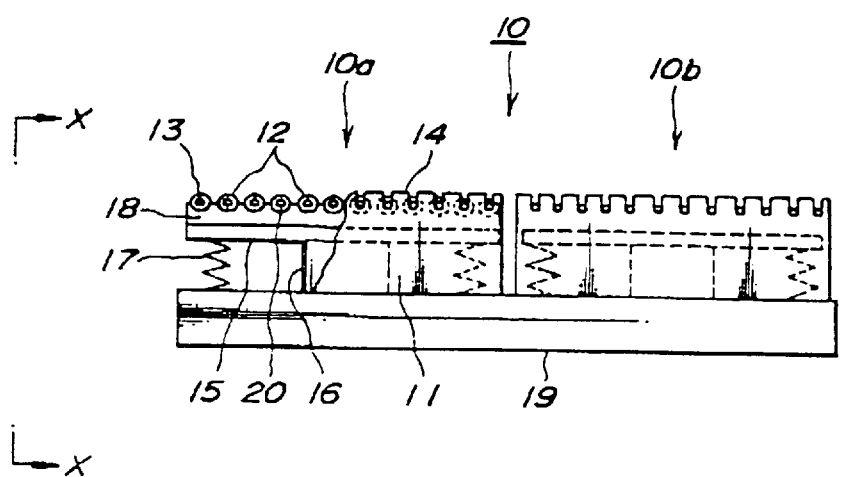
FIG_4
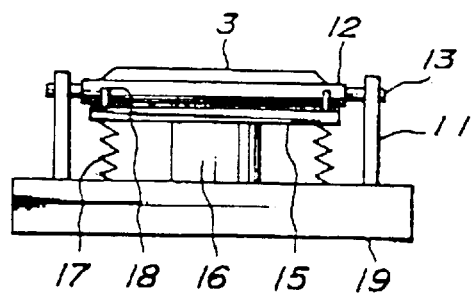

FIG_5
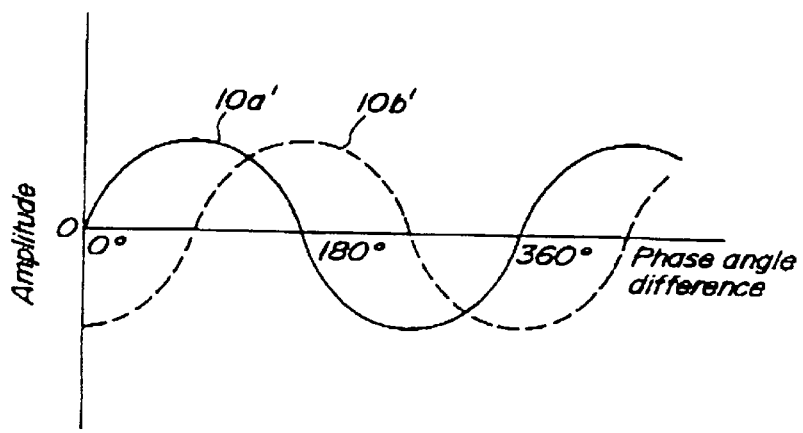
FIG_6
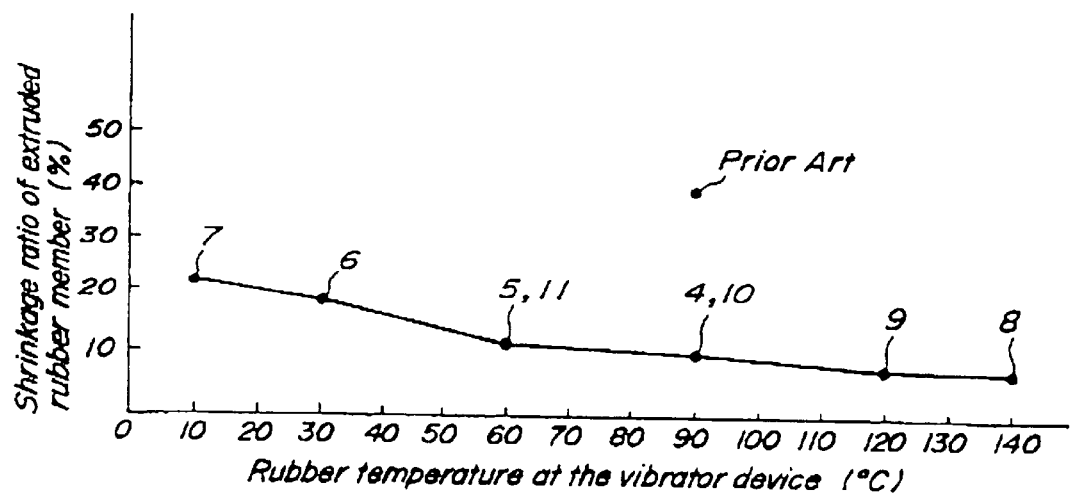

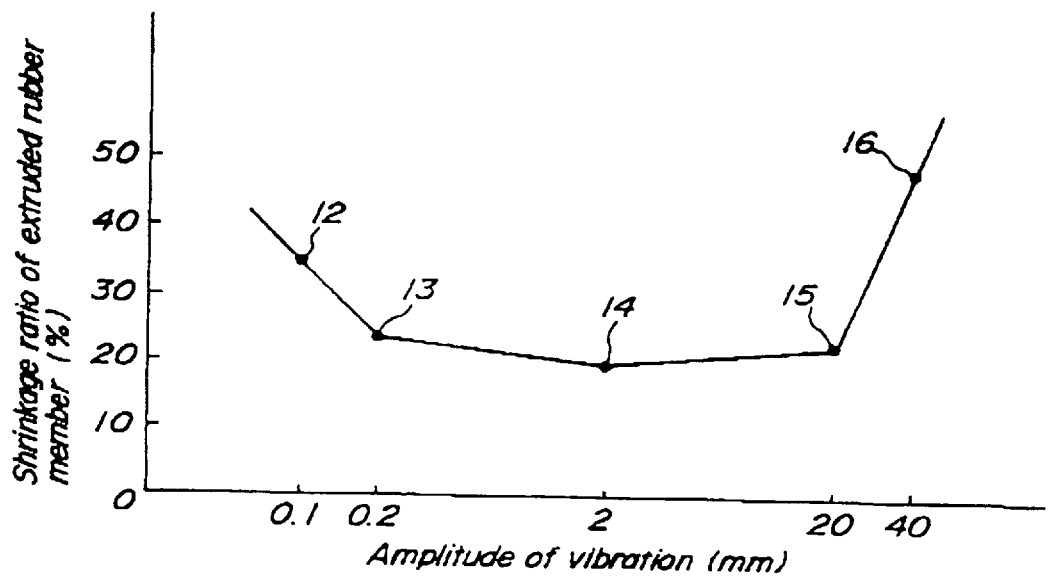
FIG_7
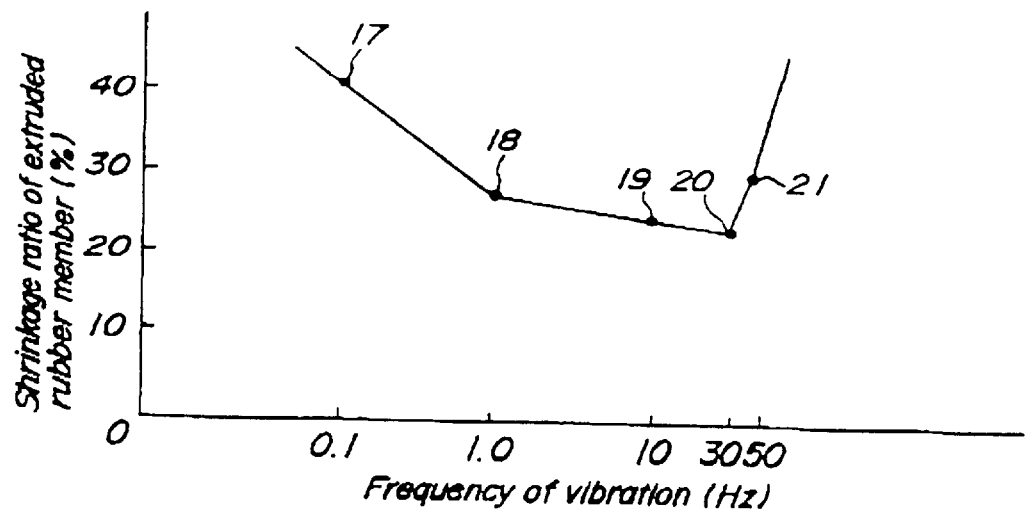
FIG_8

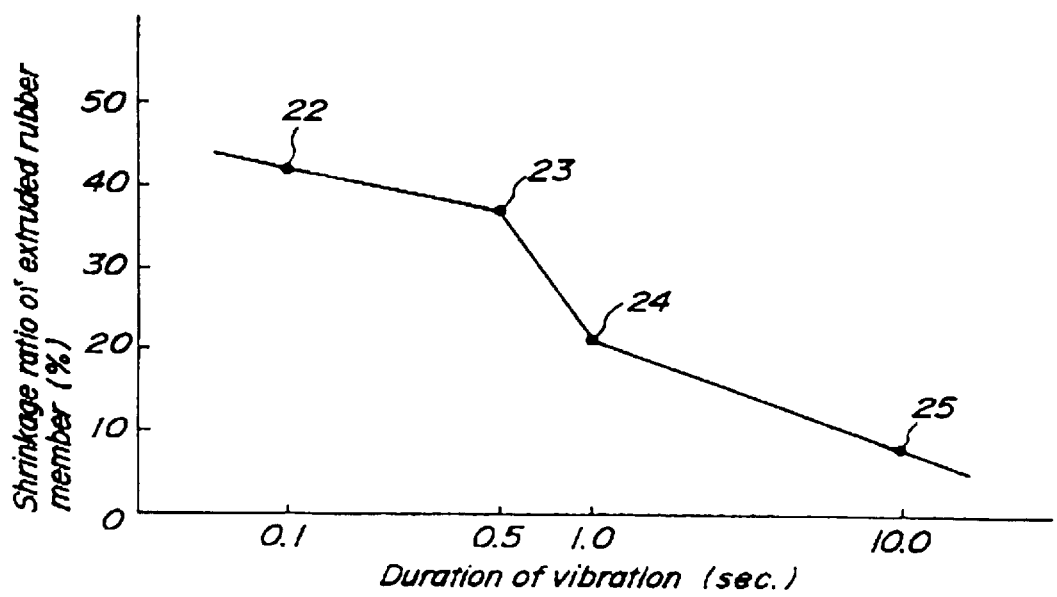

METHOD FOR REDUCING SHRINKAGE OF EXTRUDED RUBBER

BACKGROUND OF THE INVENTION

1. Field of the Invention

The present invention relates to a method and an apparatus for reducing shrinkage of a rubber member which is composed of a rubber extruded from an extruder.

2. Description of Related Art

In the rubber industry, more particularly the rubber tire industry, an extruded rubber member obtained from an extrusion train is used in a subsequent step, i.e., a green tire forming step. On such and occasion, the extruded rubber member is cut into a predetermined length before or after it has been wound around a forming drum, and shaped into a cylindrical body with the cut ends being joined to each other. Thus, when the extruded rubber member has not yet achieved a sufficient shrinkage and is prevailed by an internal stress, the rubber member formed by the cutting undergoes a rapid shrinkage due to a residual stress immediately after it has been cut into length. Thereby making it difficult or even impossible to properly join the cut ends of the rubber member with each other.

Consequently, it is generally necessary to cause a sufficient advance shrinkage of the extruded rubber within the extrusion train in order that the extruded rubber member can be maintained substantially free from undesirable posterior shrinkage.

There have been various proposals relating to a technology which serves to increase the speed of shrinkage of an extruded rubber which has been extruded from an extruder to have a desired cross-section, so as to reduce the shrinkage amount of a rubber member which is obtained from the extrusion train. According to one proposal, the conveyor for conveying the extruded rubber within the extrusion train is divided into a plurality of conveyor sections. The conveyor section situated on the downstream side is operated at a speed which is lower than the operation speed of the conveyor section on the upstream side. The extruded rubber is thus forcibly caused to undergo shrinkage at the transition between neighbouring conveyor sections operating at different speeds. According to another proposal, the extruded rubber is wound on a drum and left for a relatively long time so that the residual stress is relaxed with time.

With these proposals, however, it is still difficult to achieve a sufficient advance shrinkage of the extruded rubber within the extrusion train. Hence, in many instances, the rubber member obtained from the extrusion train has a still insufficient advance shrinkage. As a result, for example, after the extruded rubber has been wound on the forming drum and cut into a predetermined length corresponding to a single tire, the rubber member often undergoes a significant shrinkage and a satisfactory joining of the longitudinal ends cannot be achieved due to the insufficient length.

Specifically, in the case of a blended rubber composition with a low carbon content as compared with an ordinary rubber, if the extruded rubber has not achieved a sufficient advance shrinkage in the extrusion train, the rubber member obtained from the extrusion train exhibits an enhanced tendency of posterior shrinkage after cutting the extruded rubber into length, thereby giving rise to variation in the widthwise shape and/or dimension of the rubber member.

SUMMARY OF THE INVENTION

It is therefore a primary object of the present invention to provide and improved method and apparatus, capable or achieving a sufficient advance shrinkage of the extruded rubber within the extrusion train, so that the rubber member obtained from the extrusion train is substantially free from posterior shrinkage.

According to a first aspect of the present invention, there is provided a method for reducing the posterior shrinkage of a rubber member, wherein the rubber extruded from an extruder for forming the rubber member is applied with the vibration so as to increase a shrinkage speed of the extruded rubber and thereby reduce the posterior shrinkage amount of the rubber member.

The present invention is based on the novel recognition obtained from thorough research and analysis that, as will be more fully explained hereinafter, the posterior shrinkage amount of the rubber member can be effectively reduced by causing the extruded rubber to undergo a sufficient advance shrinkage at an accelerated speed. This is accomplished by applying a vibration to the extruded rubber which has been extruded from an extruder.

The shrinkage due to the vibration of the extruded rubber is dependent upon the temperature of the rubber during the application of vibration. Thus, according to an advantageous embodiment of the present invention, the extruded rubber is maintained at a controlled temperature during application of vibration, which is preferably 10°–140° C. and more preferably 60°–100° C.

Advantageously, the vibration has a frequency of 1–50 Hz, preferably 10–30 Hz, and/or an amplitude of 0.2–20 mm, preferably 2–20 mm. Furthermore, the extruded rubber may be applied with at least two vibrations having a phase angle difference which is greater than 0° but smaller than 180°.

The principle underlying the present invention and the mechanism with which the posterior shrinkage amount of the rubber member can be reduced by the application of vibration to the extruded rubber will be explained below.

By microscopically observing the internal behaviour of a viscoelastic body, such as extruded rubber, it can be seen that the polymer chain begins shrinkage from the instant of extrusion even though it is more or less restrained by gel or the like and thus tends to undergo a non-uniform shrinkage. When vibration is applied to the extruded rubber, a shearing force is applied to the restraining points, such as gel, and shearing slips occur that release the restraining points. As a result, it becomes possible for the polymer chain to undergo shrinkage like a spring.

In this instance, the amplitude and the phase angle of the vibration play an important role in applying a shearing force to the restraining points of the polymer chain by gel or the like. They uniformly cause shearing slips to occur at the restraining points which results in the shrinkage of the extruded rubber to take place with satisfactory uniformity. In particular, the application of a vibration phase angle effectively serves to release the restraining points without elongation of the polymer chain.

Further, in connection with a viscoelastic body, such as a rubber extruded from an extruder, based on a viscoelastic model well known in the art, the speed v with which the viscoelastic body undergoes shrinkage can be expressed as follows.

$$v = A \left( \frac{1}{\tau} \right) e^{-\frac{t}{\tau}} \qquad (1)$$

where A is a constant, $\tau$ is a shrinkage time inherent to the viscoelastic body, and t is a time measured from the beginning of shrinkage. Also, the shrinkage time τ can be expressed as follows.

$$\tau = \frac{B}{\omega \cdot \tan \delta} \qquad (2)$$

where B is a constant, ω is a frequency and tan δ is a ratio $G_1/G_2$ of the loss modulus of elasticity $G_1$ to the storage modulus of elasticity $G_2$ of the extruded rubber.

From the above equations (1) and (2), the inventors conceived that the shrinkage time τ of the extruded rubber can be decreased by increasing the frequency ω of the vibration applied to the rubber, and that the shrinkage speed v of the rubber, in turn, can be increased by the reduction of the shrinkage time τ.

Thus, in accordance with the present invention, the frequency ω of the vibration applied to the rubber is increased so that the extruded rubber undergoes a sufficient advance shrinkage with a high speed and a large amount, thereby reducing the posterior shrinkage of the rubber member.

Moreover, in order to sufficiently release the restraining points of the polymer chain by gel or the like, an appropriate time is required. In order to achieve a sufficient shrinkage of the extruded rubber, it is necessary to apply vibration to the extruded rubber for a duration which is longer than the shrinkage time τ. The shrinkage time of the extruded rubber is usually $10^2$–$10^3$ seconds when vibration is not applied, and $10^0$–$10^1$ seconds when vibration is applied. Thus, according to the present invention, it is necessary to apply vibration to the extruded rubber for a duration of not less than one second.

Typically, the rubber immediately after being extruded from an extruder is at a temperature of 100°–140° C., and gradually cooled to a room temperature within the extrusion train, or forcibly cooled by water or like coolant to a temperature of approximately 10° C. It has been confirmed that, in order to sufficiently release the restraining points of the polymer chain by gel or the like, application of vibration to the extruded rubber at as low a temperature as approximately 10° C. does serve to transform a non-uniform restraint of the polymer chain into a sufficiently uniform restraint. In this connection, however, a particularly advantageous effects can be achieved by maintaining the extruded rubber at a temperature of not less than 60° C. during application of vibration thereto, in view of a rapid decrease in the elastic modulus of the extruded rubber.

Also, by changing the phase angle of vibration applied to the extruded rubber, it is possible to further increase the shrinkage speed of the rubber due to the applied vibrations.

According to a second aspect of the present invention, there is provided an apparatus for reducing a posterior shrinkage amount of a rubber member composed of a rubber which has been extruded from an extruder, which comprises a vibrator device for applying a vibration to the extruded rubber, a thermoregulator for passing the extruded rubber therethrough, said thermoregulator being adjustable for changing the temperature of the extruded rubber, and a conveyor for conveying the extruded rubber along the apparatus.

Advantageously, the vibrator device comprises a rolling means which can be brought into contact with a lower surface of the extruded rubber for applying the vibration thereto. The rolling means may comprise a plurality of rollers, balls or stick-bars.

The vibrator device may comprise at least two vibrator units adapted to apply to the extruded rubber at least two vibrations having a phase angle difference which is greater than 0° but smaller than 180°.

With the apparatus according to the present invention, when the rubber is extruded from the extruder and passed through the extrusion train in contact with the upper surfaces of the rollers, balls or stick-bars of the vibrator device, a vertical reciprocation of the rollers, balls or stick-bars causes a flexural vibration of the extruded rubber with a frequency of the vibrator device. By this, the distribution of gel phase in the extruded rubber which had been non-uniform is transformed into a uniform distribution and the shrinkage of the polymer phase is enhanced to increase is the shrinkage speed. Also, by passing the extruded rubber through the thermoregulator, the temperature of the extruded rubber while it is being passed along the vibrator device can be adjusted to an optimum level depending upon the physical/chemical properties of the rubber.

BRIEF DESCRIPTION OF THE DRAWINGS

The present invention will now be explained in further detail hereinafter, with reference to some preferred embodiments shown in the accompanying drawings, in which:

FIG. 1 is a side view showing the general outline of the apparatus according to one embodiment of the present invention;

FIG. 2 is a side view similar to FIG. 1 but showing another embodiment of the present invention;

FIG. 3 is a side view showing one example of the vibrator device which can be used in the apparatus shown in FIG. 1 or 2;

FIG. 4 is a front view as seen in the direction of arrows X—X in FIG. 3;

FIG. 5 is a graph showing the waveforms of the vibrations applied by the vibration device;

FIG. 6 is a graph showing the relationship between the shrinkage ratio and the temperature of the extruded rubber;

FIG. 7 is a graph showing the relationship between the shrinkage ratio of the extruded rubber and the amplitude of the vibration applied to the rubber;

FIG. 8 is a graph showing the relationship between the shrinkage ratio of the extruded rubber and the frequency of the vibration applied to the rubber; and FIG. 9 is a graph showing the relationship between the shrinkage ratio of the extruded rubber and the duration in which vibration is applied to the rubber.

DETAILED DESCRIPTION OF THE PREFERRED EMBODIMENTS

FIGS. 1 and 2 are side views showing different embodiments of the apparatus for reducing the posterior shrinkage amount of a rubber member according to the present invention.

These embodiments are basically the same with each other in that a vibrator device 10 for applying a vibration to an extruded rubber and a thermoregulator 30 for maintaining the extruded rubber at a controlled temperature are arranged on the downstream side of an extruder 2. The difference between these embodiments resides in the location of the vibrator device 10. Thus, in the embodiment shown in FIG. 1, the vibrator device 10 is arranged adjacent to the extruder 2 and the thermoregulator 30 is arranged on the downstream side of the vibrator device 10. On the other hand, in the embodiment shown in FIG. 2, the vibrator device 10 is arranged on the downstream side of the thermoregulator 30 which, in turn, is arranged adjacent to the extruder 2. Accordingly, the same reference numerals are used in FIGS. 1 and 2 to denote the same or corresponding elements, and the following explanation will be made primarily with reference to FIG. 1, for avoiding superfluous description.

With reference to FIG. 1, the extrusion train 1 includes the extruder 2 on its upstream end, which serves to continuously extrude unvulcanized rubber 3 in the form of a strip, from an extrusion die 2a by driving an extrusion screw which is not shown. The rubber strip 3 immediately after the extrusion from the extruder 2 is typically at a temperature of 100°–140° C. and is then delivered to the vibrator device 10 on the downstream side.

As shown in FIGS. 3 and 4, the vibrator device 10 may be comprised of a first vibrator unit 10a and a second vibrator unit 10b which may be of the same structure. Thus, the following explanation will be made only with reference to the first vibrator unit 10a, for avoiding superfluous description.

The first vibrator unit 10a includes vertical is frames 11 and a plurality of rollers 12 which are supported by the frames 11 and arranged at a predetermined pitch and in parallel with each other. Each roller 12 incorporates bearings therein and has a horizontal shaft 13 which is oriented so that the axis of the shaft 13 extends at right angle to the longitudinal direction of the extrusion train. The shaft 13 has both ends which are movably fitted in, and supported by vertical slots 14 at the upper ends of the respective frames 11. These slots 14 are spaced from each other at a predetermined pitch. In the illustrated embodiment twelve such rollers 12 are arranged at a pitch of 50 mm.

The vibrator unit 10a further includes a horizontal plate member 15 arranged below the rollers 12, having four corners which are connected to the upper ends of compression coil springs 17. The lower ends of the springs 17 are connected to a stationary base member 19 which is common to the two vibrator units 10a, 10b.

The plate member 15 is provided with a center region having a lower surface which is in contact with the upper surface of a vibrator 16. The vibrator 16 has a lower portion which is fixedly secured to the stationary base member 19. The vibrator 16 may be of a pneumatic-type, for example, and adapted to cause a vertical vibration of the plate member 15 with adjustable amplitude and/or frequency.

A pair of elongate edge members 18 are fixedly provided for the plate member 15 on its both sides. Each edge member 18 is formed with semi-circular recesses 20 which are in contact with the lower surfaces of the relevant rollers 12. These recesses 20 are spaced from each other at a predetermined pitch. In the illustrated embodiment, twelve such recesses 20 are arranged at a pitch of 50 mm. Thus, when the vibrator 16 is excited, the plate member 15 is placed in a vertical vibration together with the edge members 18 and the rollers 12 in contact therewith.

It should be noted that the first vibrator unit 10a is comprised of the frame 11, rollers 12, shafts 13, slots 14, plate member 15, vibrator 16, compression coil springs 17, edge members 18, stationary base member 19, and semi-circular recesses 20, etc.

Referring back to FIG. 1, the thermoregulator 30 on the downstream side of the vibrator device 10 includes a vessel 31 which is filled by a heat medium 32, such as appropriate gas or liquid. In the illustrated embodiment, the heat medium 32 comprises water. The thermoregulator 30 is arranged such that the heat medium 32 is maintained at a controlled temperature, e.g., 10°–100° C. A belt conveyor 33 is arranged within the vessel 31 and is comprised of a pair of pulleys 34, 35 and an endless belt 36 wound around and passed between the pulleys 34, 35. The pulley 35 is driven by a motor, not shown, so that the endless belt 26 is moved forward as shown by arrow and the extruded rubber strip 3 supported on the belt 36 is transferred toward the downstream side. Since the thermoregulator 30 shown in FIG. 1 is arranged adjacent to the extruder 2, the extruded rubber strip 3 is cooled by the heat medium 32, typically to the room temperature, while it is transferred within the vessel 31 of the thermoregulator 30. It should be noted that the thermoregulator 30 is comprised of the vessel 31, heat medium 32, belt conveyor 33, pulleys 34, 35, endless belt 36, etc.

A further conveyor 40 is arranged on the downstream side of the thermoregulator 30, and includes a pair of pulleys 41, 42 and an endless belt 43 wound around and passed between the pulleys 41, 42. The pulley 42 is driven by a motor, not shown, so that the endless belt 43 is moved forward as shown by arrow and the extruded rubber strip 3 supported on the belt 43 is transferred toward a movable trolley 50 which carries a winding drum thereon.

The extruded rubber strip 3 which has been continuously supplied is cut into rubber member 51 having a predetermined length, e.g. a length corresponding to thirty tires, by a cutting device which is not shown. Subsequently, the rubber member 51 is wound around the drum on the trolley 50, and the trolley 50 is then moved to a subsequent station which is a green tire forming station.

It should be noted that the extrusion train 1 as a whole is comprised of the extruder 2 inclusive of the extrusion die 2a, as well as the vibrator device 10, thermoregulator 30, conveyor 40, trolley 50 and the winding drum, etc.

The operation of the apparatus according to the embodiment shown in FIG. 1 will be explained below.

The extruder 2 serves to continuously extrude a rubber strip 3 from the die 2a. Immediately after the extrusion, the rubber strip 3 is fed toward the downstream side, with its lower surface maintaining contact with the surfaces of the rollers 12 of the vibrator device 10 comprised of two vibrator units 10a, 10b. During the transfer along the vibrator device 10, the rubber strip 3 is placed under a vertical vibration at appropriate amplitude and frequency, by the vibrators 16 and via the respective rollers 12. By this, in a microscopic sense, the running rubber strip 3 assumes a sinusoidal shape with the lapse of time.

Since the vibrator device 10 is comprised of two vibrator units 10a, 10b, it is possible to apply different vibrations to the extruded rubber strip 3, having an appropriate phase angle difference relative to is each other. Thus, as exemplified by FIG. 5, the waveform 10a' of the vibration excited by the first vibrator unit 10a and the waveform 10b' of the vibration excited by the second vibrator unit 10b may have a phase angle difference of 90°.

In the embodiment of FIG. 1 including a thermoregulator 30 which is arranged on the downstream side of the vibrator device 10, the extruded rubber applied with vibration is subjected to an accelerated cooling by the heat medium within the vessel 31. The extruded rubber strip 3 is transferred by the belt conveyor 33 within the vessel 31 and by a further conveyor 40 on the downstream side of the thermoregulator 30, is cut into a predetermined length and eventually wound around the winding drum on the trolley 50 as the rubber member 51 for use in the subsequent station. The application of vibrations to the extruded rubber 3 serves to increase the shrinkage speed of the extruded rubber 3 and cause a sufficient advance shrinkage of the extruded rubber within the extrusion train 1. Thus, it is possible to minimize the amount of posterior shrinkage of the rubber member 51.

In the embodiment of FIG. 2 including a thermoregulator 30 which is arranged adjacent to the extruder 2 on the upstream side of the vibrator device 10, the extruded rubber strip 3 is applied with vibration after it has been placed under a controlled temperature by the heat medium within the vessel 31. In this instance, the heat medium may be a warm water or gas.

In order to confirm the functional advantages of the present invention, various experiments were conducted as explained below.

In this connection, the shrinkage ratio of the extruded rubber as the object of the experiments is determined in the following manner. That is, when the rubber strip 3 has been continuously extruded from the extruder 2, the entire upper surface of the rubber strip is applied with appropriate bench marks at a constant interval of 30 cm. After the extruded rubber strip 3 has been passed through the various devices of the extrusion train 1, the rubber strip 3 is wound around the drum on the trolley 50 as the rubber member 51 and left for 24 hours to undergo a shrinkage. Then, the rubber member 51 is unwound from the drum to measure the distance between adjacent bench marks. The ratio between the initial interval between adjacent bench marks immediately after the extrusion, i.e., 30 cm, and the distance between adjacent bench marks after the posterior shrinkage of the rubber member 51 is defined as the shrinkage ratio.

First of all, using the apparatus shown in FIG. 1, experiment has been carried out to determine the shrinkage ratio or the extruded rubber according to the prior art method wherein the vibrator device 10 is not operated, and according to examples 1–3 of the inventive method wherein the vibrator device 10 is operated. The conditions and the results of this experiment is shown in Table 1 as follows.

TABLE 1

| Items | Prior Art | Example 1 | Example 2 | Example 3 |
|---|---|---|---|---|
| Rubber temperature immediately after extrusion (°C.) | 100 | 100 | 100 | 100 |
| Application of vibration | No | Yes | Yes | Yes |
| Frequency of vibration (Hz) | — | 1 | 10 | 30 |
| Amplitude of vibration (mm) | — | 6 | 2 | 1 |
| Duration of vibration (sec) | — | 10 | 10 | 10 |
| Rubber temperature at the vibrator device (°C.) | 90 | 90 | 90 | 90 |
| Shrinkage ratio of extruded rubber member (%) | 40 | 12 | 21 | 33 |

It can be appreciated from Table 1 that the rubber member 51 obtained from an extruded rubber strip 3 which has not been subjected to vibration according to the prior art method has a shrinkage ratio which is as high as 40%. In contrast, the rubber members 51 presubjected to vibration according to the examples 1–3 of the inventive method have shrinkage ratios reduced to 12–33%. Thus, it is evident that the application of vibration to the extruded rubber strip plays a significantly important role to reduce the shrinkage ratio of the rubber members.

Incidentally, the shrinkage ratio of the rubber member 51 according to the examples 1–3 exhibits an incremental tendency with an increase in the frequency of the applied vibration. Such a tendency is believed to be primarily due to the fact that the amplitude of the applied vibration has been decreased with an increase in the frequency.

Next, in order to ascertain the influence of the temperature of the extruded rubber strip 3 at the vibrator device 10, another experiment has been carried out using the apparatus shown in FIG. 2, and with reference to examples 4–11 of the extruded rubber maintained at different temperatures. The conditions of this experiment are shown in the following Table 2, and the results are shown in FIG. 6. The numerals in FIG. 6 correspond to the respective examples.

TABLE 2

| Items | Example 4 | Example 5 | Example 6 | Example 7 | Example 8 | Example 9 | Example 10 | Example 11 |
|---|---|---|---|---|---|---|---|---|
| Rubber temperature immediately after extrusion (°C.) | 100 | 100 | 100 | 100 | 150 | 130 | 100 | 70 |
| Application of vibration | Yes | Yes | Yes | Yes | Yes | Yes | Yes | |
| Frequency of vibration (Hz) | 10 | 10 | 10 | 10 | 10 | 10 | 10 | 10 |
| Amplitude of vibration (mm) | 2 | 2 | 2 | 2 | 2 | 2 | 2 | 2 |
| Duration of vibration (sec) | 10 | 10 | 10 | 10 | 10 | 10 | 10 | |
| Rubber temperature at the vibrator device (°C.) | 90 | 60 | 30 | 10 | 140 | 120 | 90 | 60 |

It can be appreciated from Table 2 and FIG. 6 that the shrinkage ratio of the extruded rubber member 51 tends to be reduced within a temperature range of 10°–140° C. at the vibrator device 10.

Also, in order to ascertain the influence of the amplitude of the vibration applied to the extruded rubber strip 3 at the vibrator device 10, another experiment was carried out using the apparatus shown in FIG. 1, and with reference to examples 12–16 of the extruded rubber. The conditions of this experiment are shown in the following Table 3, and the results are shown in FIG. 7.

TABLE 3

| Items | Example 12 | Example 13 | Example 14 | Example 15 | Example 16 |
|---|---|---|---|---|---|
| Rubber temperature immediately after extrusion (°C.) | 100 | 100 | 100 | 100 | 100 |
| Application of vibration | Yes | Yes | Yes | Yes | Yes |
| Frequency of vibration (Hz) | 1 | 1 | 1 | 1 | 1 |
| Amplitude of vibration (mm) | 0.1 | 0.2 | 2 | 20 | 40 |
| Duration of vibration (sec) | 10 | 10 | 10 | 10 | 10 |
| Rubber temperature at the vibrator device (°C.) | 90 | 90 | 90 | 90 | 90 |

It can be appreciated from Table 3 and FIG. 7 that the shrinkage ratio of the extruded rubber member 51 tends to be reduced within an amplitude range of 0.2–20 mm at the vibrator device 10.

Additionally, in order to ascertain the influence of the frequency of the vibration applied to the extruded rubber strip 3 at the vibrator device 10, another experiment was carried out using the apparatus shown in FIG. 1, and with reference to examples 17–21 of the extruded rubber. The conditions of this experiment are shown in Table 4, and FIG. 8.

TABLE 4

| Items | Example 17 | Example 18 | Example 19 | Example 20 | Example 21 |
|---|---|---|---|---|---|
| Rubber temperature immediately after extrusion (°C.) | 100 | 100 | 100 | 100 | 100 |
| Application of vibration | Yes | Yes | Yes | Yes | Yes |
| Frequency of vibration (Hz) | 0.1 | 1.0 | 10 | 30 | 50 |
| Amplitude of vibration (mm) | 0.2 | 0.2 | 0.2 | 0.2 | 0.2 |
| Duration of vibration (sec) | 10 | 10 | 10 | 10 | 10 |
| Rubber temperature at the vibrator device (°C.) | 90 | 90 | 90 | 90 | 90 |

It can be appreciated from Table 4 and FIG. 8 that the shrinkage ratio of the extruded rubber member 51 tends to be reduced within an frequency range of 1.0–50 Hz at the vibrator device 10.

Finally, in order to ascertain the influence of the duration of the vibration applied to the extruded rubber strip 3 at the vibrator device 10, still another experiment was carried out using the apparatus shown in FIG. 1, and with reference to examples 22–25 of the extruded rubber. The conditions of this experiment are shown in Table 5, and FIG. 9.

TABLE 5

| Items | Example 22 | Example 23 | Example 24 | Example 25 |
|---|---|---|---|---|
| Rubber temperature immediately after extrusion (°C.) | 120 | 120 | 120 | 120 |
| Application of vibration | Yes | Yes | Yes | Yes |
| Frequency of vibration (Hz) | 10 | 10 | 10 | 10 |
| Amplitude of vibration (mm) | 2 | 2 | 2 | 2 |
| Duration of vibration (sec) | 0.1 | 0.5 | 1.0 | 10 |
| Rubber temperature at the vibrator device (°C.) | 110 | 110 | 110 | 110 |

It can be appreciated from Table 5 and FIG. 9 that the shrinkage ratio of the extruded rubber member 51 tends to be reduced within a duration of vibration of not less than 1 second.

As fully explained above, the present invention provides an improved method and apparatus for reducing a posterior shrinkage amount of a rubber member which is comprised of rubber extruded from an extruder. This is accomplished by applying a vibration to the extruded rubber so as to increase the shrinkage speed of the extruded rubber and cause a sufficient advance shrinkage of the extruded rubber within the extrusion train, thereby reducing the posterior shrinkage amount of the rubber member.

While the present invention has been explained above with reference to certain preferred embodiments, it is of course that various modifications and/or alterations may be made without departing from the scope of the invention as defined by the appended claims.

For example, the rollers 12 of the vibrator device 10 may be replaced by a number of balls arranged on the upper surface of the plate member 15.

Also, instead of providing the vibrator device with first and second vibrator units 10a, 10b of the same construction, as in the embodiments shown in FIGS. 1 and 2, the second vibrator unit 10b may be replaced by a third unit in which a number of balls are arranged on the upper surface of the plate member 15. In this instance, a plurality of first units and a plurality of third units may be arranged alternately to each other.

Furthermore, in the vibrator device shown in FIGS. 3 and 4, each roller 12 may be associated with an individual vibrator 16 so that each roller 12 undergoes an independent vibration.

Finally, instead of providing such mechanical vibrator device, the belt conveyor 33 of the thermoregulator 30 may be replaced by a number of rollers which are spaced from each other so that air can be discharged through gaps between adjacent rollers. In this instance, the extruded rubber strip in the thermoregulator is placed under vibration by air bubbles.

We claim:

1. A method for reducing posterior shrinkage of an extruded rubber member, comprising the steps of:
   extruding a rubber material at an extruding temperature between 100 degrees Celsius and 140 degrees Celsius to produce an extruded rubber member;
   vibrating the extruded rubber member at a vibrating temperature between 100 degrees Celsius and 140 degrees Celsius and a vibrating frequency and amplitude sufficient to increase a shrinkage speed of the extruded rubber member and cause advanced shrinkage thereof, thereby reducing posterior shrinkage of the extruded rubber member; and
   then cooling the vibrated, extruded rubber member to a cooling temperature between 10 degrees Celsius and the vibrating temperature, resulting in the extruded rubber member having reduced posterior shrinkage.

2. The method according to claim 1, wherein the step of vibrating the extruded rubber member occurs at a frequency between 1 Hertz and 30 Hertz.

3. The method according to claim 1, wherein the step of vibrating the extruded rubber member occurs at an amplitude between 2 millimeters and 20 millimeters.

4. The method according to claim 1, wherein vibrating the extruded rubber member occurs at a phase angle difference between 0° and 180°.

5. A method for manufacturing an extruded rubber member having reduced posterior shrinkage where the extruded rubber member is made of a blended rubber composition with a low carbon content, comprising the steps of:
   extruding a blended rubber composition having a low carbon content at an extruding temperature between 100 degrees Celsius and 140 degrees Celsius to form an extruded rubber member:
   vibrating the extruded rubber member for a duration of at least one second at a frequency between 1 Hertz and 30

Hertz, an amplitude between 2 millimeters and 20 millimeters, a phase angle difference between 0° and 180° and a vibrating temperature between 60 degrees Celsius and 100 degrees Celsius to increase a shrinkage speed of the extruded rubber member and cause advanced shrinkage thereof, thereby reducing posterior shrinkage of the extruded rubber member; and then cooling the extruded rubber member to a cooling temperature between 10 degrees Celsius and the vibrating temperature resulting in the extruded rubber member having reduced posterior shrinkage.

6. A method for manufacturing a tire from a blended rubber composition having a low carbon content, comprising the steps of:

extruding a blended rubber composition having a low carbon content at an extruding temperature between 100 degrees Celsius and 140 degrees Celsius to form an extruded rubber member;

vibrating the extruded rubber member for a duration of at least one second at a frequency between 1 Hertz and 30 Hertz, an amplitude between 2 millimeters and 20 millimeters, a phase angle difference between 0° and 180° and a vibrating temperature range between 60 degrees Celsius and 100 degrees Celsius to increase a shrinkage speed of the extruded rubber member and cause advanced shrinkage thereof, thereby reducing posterior shrinkage of the extruded rubber member;

then cooling the extruded rubber member to a cooling temperature between 10 degrees Celsius and the vibrating temperature resulting in the extruded rubber member having reduced posterior shrinkage;

cutting the extruded, vibrated, and cooled rubber member to a predetermined length having a first end and a second end;

winding the predetermined length of the extruded, vibrated and cooled rubber member onto a forming drum; and connecting the first end and second end together, thereby forming a cylindrically shaped tire.

* * * * *